United States Patent
Goldfain et al.

(10) Patent No.: US 9,917,791 B1
(45) Date of Patent: Mar. 13, 2018

(54) SYSTEMS AND METHODS FOR SUSPENDED PLAYBACK

(71) Applicant: Netflix, Inc., Los Gatos, CA (US)

(72) Inventors: Francois Goldfain, Sunnyvale, CA (US); Shaomei Chen, Saratoga, CA (US)

(73) Assignee: NETFLIX, INC., Los Gatos, CA (US)

( * ) Notice: Subject to any disclaimer, the term of this patent is extended or adjusted under 35 U.S.C. 154(b) by 25 days.

(21) Appl. No.: 14/498,762

(22) Filed: Sep. 26, 2014

(51) Int. Cl.
*H04L 29/06* (2006.01)
*H04L 12/911* (2013.01)
*H04L 29/08* (2006.01)
*G06F 21/60* (2013.01)

(52) U.S. Cl.
CPC .......... *H04L 47/821* (2013.01); *G06F 21/606* (2013.01); *H04L 63/029* (2013.01); *H04L 63/0457* (2013.01); *H04L 65/60* (2013.01); *H04L 67/141* (2013.01); *H04L 67/145* (2013.01)

(58) Field of Classification Search
CPC ... H04L 63/029; H04L 67/145; H04L 67/141; H04L 41/821; H04L 47/824; G06F 21/606; H04N 21/433
See application file for complete search history.

(56) References Cited

U.S. PATENT DOCUMENTS

| | | | | |
|---|---|---|---|---|
| 8,624,908 B1 * | 1/2014 | Knee | ...................... | G09G 5/003 345/537 |
| 2009/0154570 A1 * | 6/2009 | Sathianathan | ... | H04N 21/41407 375/240.25 |
| 2010/0043005 A1 * | 2/2010 | Ahuja | .................... | G06F 9/5077 718/104 |
| 2010/0131987 A1 * | 5/2010 | Kent, Jr. | ................. | H04N 5/782 725/55 |
| 2011/0055841 A1 * | 3/2011 | Senno | ........................ | G06F 9/52 718/103 |
| 2012/0102191 A1 * | 4/2012 | Rabii | ..................... | G06F 9/5011 709/224 |
| 2013/0279877 A1 * | 10/2013 | Boak | ....................... | H04N 5/917 386/231 |
| 2014/0113705 A1 * | 4/2014 | Fear | ........................ | A63F 13/35 3/35 |
| 2014/0289826 A1 * | 9/2014 | Croome | ................ | H04L 67/141 726/5 |
| 2015/0268717 A1 * | 9/2015 | Schlumberger | ......... | A63F 13/00 345/156 |

* cited by examiner

*Primary Examiner* — Thaddeus Plecha
(74) *Attorney, Agent, or Firm* — Artegis Law Group, LLP

(57) ABSTRACT

In an approach, a first application executing on a first computer acquires, one or more resources of the first computer, wherein the one or more resources include one or more shared resources that are shared among applications of the first computer. The first application receives a media stream from a second computer and presents playback of the media stream. In response to detecting that priority within the first computer has shifted to a second application, the first application pauses playback of the media stream and releases the one or more shared resources while retaining one or more remaining resources that relate to a session context. In response to detecting that priority has shifted back to the first application, the first application re-acquires the one or more shared resources and resumes playback of the media stream based on the one or more remaining resources.

21 Claims, 5 Drawing Sheets ion is especially -->

SYSTEMS AND METHODS FOR SUSPENDED PLAYBACK

TECHNICAL FIELD

The present disclosure generally relates to improved computer devices and computing processes that address aspects of suspended playback for efficient resumption media content in digital streaming media playback systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Mobile applications are computer programs designed to run on mobile devices, such as smartphones, tablets, and so forth. However, since mobile devices tend to have limited resources compared to their personal computer counterparts, application developers face significant challenges managing those resources in mobile environments. For example, within the same mobile device, multiple applications may need to manage and share resources such as memory, network connections, processor time, hardware encoders/decoders, screen space, screen buffers, and so forth.

One context in which sharing resources is especially challenging involves applications which present media. Media applications tend to be particularly resource intensive and, due to the limited capacity of mobile devices, often cannot be run simultaneously with other applications without significantly degrading system performance. For example, many mobile operating systems, such as Android, place applications that are not the current focus into a suspended or lower priority state. For instance, this state change may occur when a user minimizes the current application or executes a new application. During this state change resources, such as memory, hardware components, software components, and so forth that had been acquired by the application are released so that the operating system can provide those resources to higher priority applications.

When the application again becomes the focus, the application reacquires the released resources and redraws the user interface and other windows to be displayed to the user. However, some session specific resources, once released, may not be recoverable without significant delay. For example, in the context of streaming media, when the media buffer is released the data within that buffer needs to be reacquired from the content provider, such as a server, a content distribution network, a storage device, and so forth. Consequently, upon reactivating the application, the user may be forced to wait for the application to reestablish a connection to the source of the media and refill the buffer before playback can resume. The aforementioned situation can result in a frustrating experience since even a brief minimization of the application (for example, to check email or respond to a text message) can introduce a significant delay when resuming playback due to the need to rebuild session specific resources. As a result, there is need in the industry for a technique which allows playback to be resumed in an expedited and efficient manner despite application context switches in a resource limited environment.

DETAILED DESCRIPTION

Figure 1:
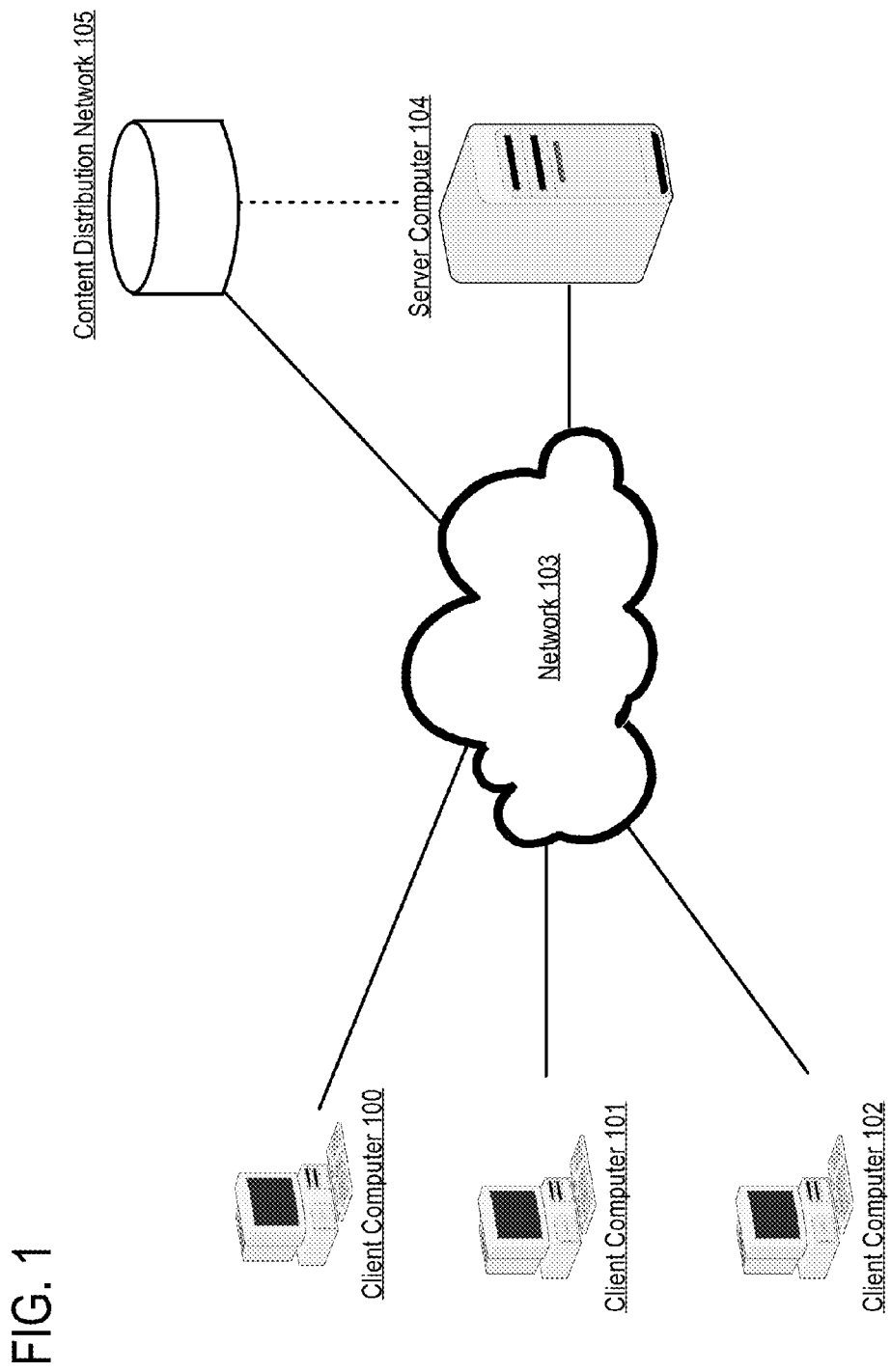
FIG. 1 illustrates an example operating environment upon which an embodiment may be implemented.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

Embodiments are described herein according to the following outline:
  1.0 General Overview
  2.0 Example Operating Environment
  3.0 Media Application Architecture
  4.0 Suspended Playback Process Flow
  5.0 Example Notification
  6.0 Implementation Mechanisms—Hardware Overview
  7.0 Extensions and Alternatives
  8.0 Additional Disclosure

1.0 General Overview

Techniques for suspended playback are described; various embodiments provide improved computer devices and computing processes that can suspend and resume playback of media content in digital streaming media playback systems in ways that are more efficient and responsive to changes in user behavior or operational functionality of streaming media devices, and that provide distinct improvements and different technical structure and function as compared to the general idea of pausing and resuming the playback of digital media.

In an embodiment, a method comprises: acquiring, by a first application executing on a first computer, one or more resources of the first computer, wherein the one or more resources include one or more shared resources that are shared among applications of the first computer; receiving, by the first application, a media stream from a second computer; presenting playback, by the first application, of the media stream; in response to detecting that priority within the first computer has shifted to a second application executing on the first computer, the first application pausing playback of the media stream and releasing the one or more shared resources while retaining one or more remaining resources of the one or more resources that relate to a session context; in response to detecting that priority has shifted back to the first application, the first application re-acquiring the one or more shared resources and resuming playback of the media stream based at least in part on the one or more remaining resources that relate to the session context; wherein the method is performed by one or more computing devices.

In an embodiment, the one or more resources include a streaming media buffer and the method further comprises: in response to receiving the media stream from the second computer, storing first data from the media stream in the streaming media buffer, wherein the streaming media buffer is a member of the one or more remaining resources that relate to the session context and the playback is resumed by at least retrieving second data from the streaming media buffer for presentation during the playback.

In an embodiment, the playback of the media stream is resumed before additional data of the media stream is received from the second computer and added to the streaming media buffer.

In an embodiment, the method further comprises: establishing a secure connection to the second computer, wherein the secure connection is based on one or more cryptographic keys, wherein the media stream is received over the secure connection and the one or more cryptographic keys are a member of the one or more remaining resources that relate to the session context; in response to detecting that priority has shifted back to the first application, the first application re-establishing the secure connection to the second computer using the one or more cryptographic keys.

In an embodiment, the one or more shared resources include a decoder for decoding the media stream.

In an embodiment, the decoder is implemented at least partially in hardware.

In an embodiment, the one or more shared resources include a screen buffer that controls a screen of the first computer.

In an embodiment, the playback is resumed at a point in time that is earlier than when first application paused the playback of the media stream.

In an embodiment, the method further comprises: in response to detecting that priority within the first computer has shifted to the second application, the first application causing the first computer to display a notification that contains information related to the playback of the media stream.

In an embodiment, the notification includes one or more of: time information, a graphic associated with the media stream, a title of the media stream, an episode identifier of the media stream, a season identifier of the media stream, a chapter identifier of the media stream, a total playback time of the media stream, a playback remaining time of the media stream, or a resumption control that, when selected, causes the first computer to shift priority back to the first application.

In other embodiments, the invention encompasses a computer apparatus, a computer system, and a computer-readable medium configured to carry out the foregoing steps.

2.0 Example Operating Environment

FIG. 1 illustrates an example operating environment upon which an embodiment may be implemented. In FIG. 1, client computer 100, client computer 101, and client computer 102 (collectively, "the clients") are communicatively coupled to server computer 104 and content distribution network ("CDN") 105 over network 103. Although FIG. 1 depicts only a particular number of elements, a practical environment may contain hundreds or thousands of each depicted element. In addition, a practical environment may contain additional components which have been omitted from FIG. 1 to avoid obscuring the illustration. For example, the CDN 105 may contain or be communicatively coupled to one or more storage devices that store media for streaming. As another example, the server computer 104 may be communicatively coupled to a storage device that stores account information for one or more user accounts. In addition, although actions and functionality will be described with respect to specific elements, in other embodiments the actions and/or functionality may instead be performed by another element depicted in FIG. 1 or another element not depicted in FIG. 1. Furthermore, other embodiments may add to, remove from, divide out, or combine the elements depicted in FIG. 1. For example, in some embodiments the server computer 104 may be part of CDN 105. As another example, the server computer 104 may take over the responsibilities of the CDN 105 with the CDN 105 being omitted from the embodiment.

In an embodiment, the clients represent one or more computing devices, such as personal computers, workstations, laptops, netbooks, tablet computers, game consoles, set-top boxes, digital video recorders, smartphones, and so forth. In an embodiment, the clients are configured to access a media service from the server computer 104. For example, if the server computer 104 runs a web service, the clients may execute browser applications which send HTTP requests to the server computer 104. As another example, if the server computer 104 runs a mobile service, the clients may execute a mobile application which communicates with the server computer 104 over network 103. In an embodiment, the clients execute an application which accesses a video streaming service run by the server computer 104 and allows selection of one or more videos for playback on the clients or other related devices. For example, if the clients are part of a second screen system, such as a mobile device controlling a television, the clients may cause the stream to play on the paired device in addition to or instead of its own screen. Selection may occur via user input, programmatic input or other data sources.

In some embodiments, in order to access the service provided by the server computer 104, the clients provide identifying information, such as an account name/password or secured certificate, to "log in" to a particular account. In some embodiments, the communications between the clients and the server computer 104 are secured with any number of symmetric and/or asymmetric cryptographic protocols. For example, the clients may be assigned a cryptographic key by a manufacturer, the server computer 104, or other authority to use with the cryptographic protocols. As another example, the clients may negotiate a key to use during a particular session with the server computer 104, such as via the Diffie-Hellman Key Exchange Protocol. In addition, communications between the clients and the CDN 105 may be encrypted using the same or similar techniques as those described in relation to the server computer 104.

In an embodiment, network 103 represents any combination of one or more local networks, wide area networks, or internetworks. Data exchanged over the networks may be transferred using any number of network layer protocols, such as Internet Protocol (IP), Multiprotocol Label Switching (MPLS), Asynchronous Transfer Mode (ATM), and Frame Relay. Furthermore, in embodiments where the network 103 represents a combination of multiple sub-networks, different network layer protocols may be used at each of the underlying sub-networks.

In an embodiment, the server computer 104 represents a computing device configured to provide a media service to the clients. In some embodiments, the server computer 104 represents a backend server that negotiates the exchange of media between the clients and the CDN 105. For example, the clients may communicate with the server computer 104 using a control protocol that allows the clients to request particular media for streaming. In operation, any of the clients may request a particular program title, such as a particular movie or TV show, from the server computer 104. In response, the server computer determines a location in CDN 105 over which is distributed one or more files or assets representing encodings of the requested program that can be streamed to the requesting client. The server computer 104 returns a location identifier for the CDN 105 to the requesting client. The requesting client establishes a connection to the CDN 105 and obtains a data stream from the location without involving the server computer 104 in the streaming delivery of the program. However, in other embodiments, the server computer 104 may act as an intermediary between the clients and the CDN 105.

The CDN 105 represents one or more computer systems configured to serve, download, or stream requests for digital media. In some embodiments, the CDN 105 may be implemented as cloud storage or other applicable environment. For purposes of illustrating a clear example, the CDN 105 is shown in FIG. 1 as associated with server computer 104, but in other embodiments the CDN 105 may be remotely located with respect to server computer 104 and/or distributed across a large number of servers, storage systems, and the like. In an embodiment, the CDN 105 includes a collection of storage devices upon which are stored multimedia assets.

3.0 Media Application Architecture

Figure 2:
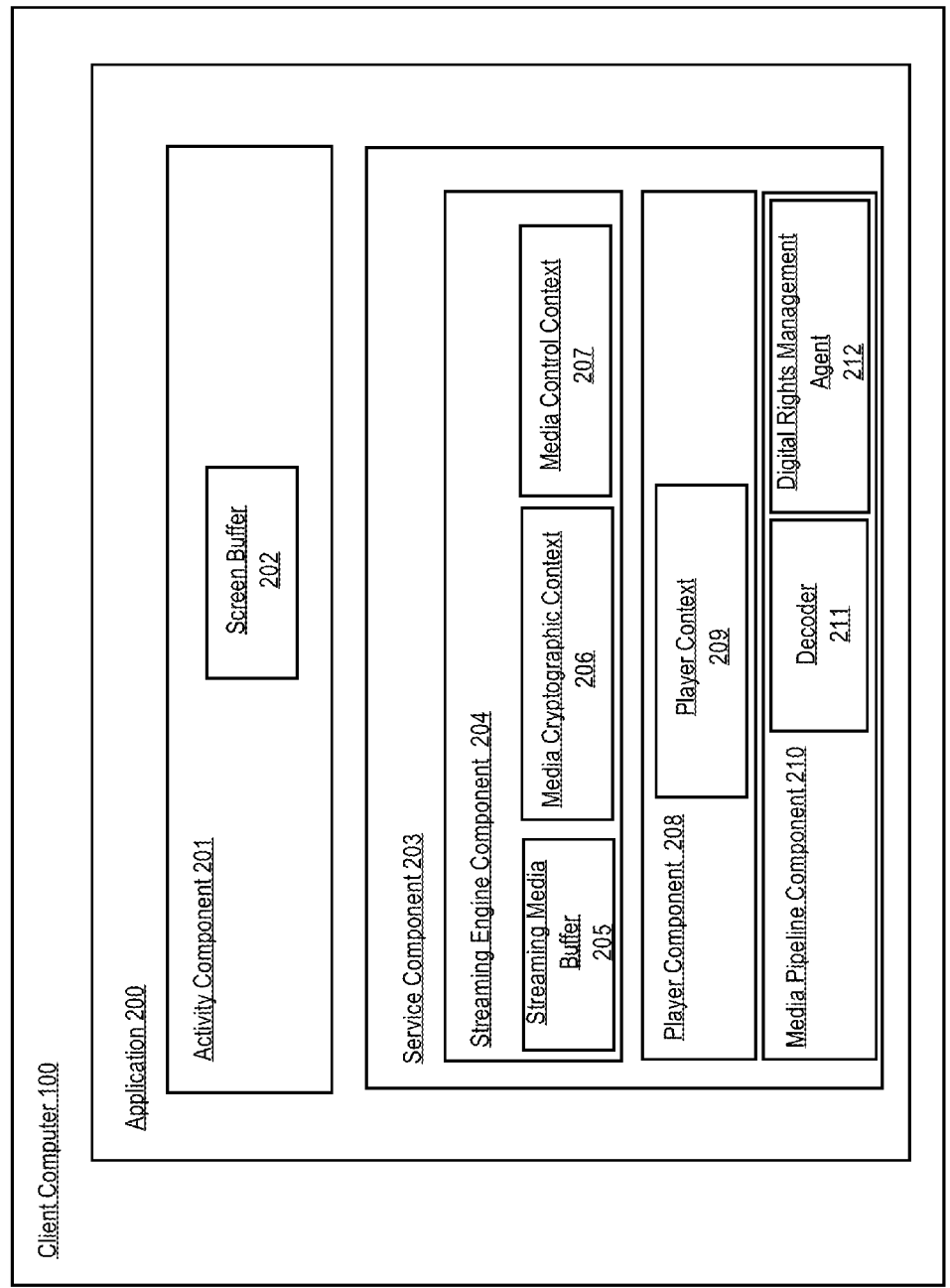
FIG. 2 illustrates a media application executing on a computer device in block diagram form according to an embodiment.

FIG. 2 illustrates a media application executing on a computing device in block diagram form according to an embodiment. For the sake of illustrating clear examples, the application 200 of FIG. 2 is illustrated as executing on client computer 100 of FIG. 1. However, the choice to illustrate application 200 with respect to client computer 100 is not critical. Other embodiments may implement the application architecture of FIG. 2 on any number of other computers, such as client computer 101 and client computer 102. In addition, although only a particular number of elements are illustrated in FIG. 2, other embodiments may contain many more elements than those explicitly illustrated. For example, FIG. 2 illustrates only application 200 executing on client computer 100, but in a practical environment the client computer 100 may have multiple applications executing at once and/or set to an inactive status within a priority queue/stack. Furthermore, a practical implementation of the application 200 may have many more components and/or sub-components than those depicted in FIG. 2. For example, the application 200 may also contain or have access to components responsible for managing network or transport layer connections with the server computer 104 and/or CDN 105. However, only select components have been illustrated in order to avoid obscuring the innovative features.

In various embodiments, the components and sub-components of application 200 represent one or more computer programs or other software components, digital logic in the form of ASICs, FPGAs or other hardware components, or combinations thereof. Furthermore, although certain components illustrated as part of application 200 are depicted as "containing" particular sub-components, those sub-components are not necessarily part of the application 200 from an architectural or program standpoint. For example, assuming the components represent software components set in a class hierarchy, the components may instantiate the sub-components. However, as another example, one or more of the sub-components may represent resources provided by the operating system of the client computer 100 and obtained temporarily by the application 200 to perform certain tasks. Thus, rather than actually "containing" the sub-components, in some embodiments the hierarchy instead denotes a "is available to", "has access to", or "uses" relationship as opposed to a "contains" relationship. Thus, although the components illustrated in FIG. 2 will be described as "of" the application 200, depending on the embodiment, many components may in fact be shared across multiple applications of the client computer 100 and merely acquired by the application 200 to perform various tasks. For example, the decoder 211 may be implemented fully or partially in hardware and not technically "part" of application 200, but instead is a resource whose lock is held by application 200.

In some embodiments, the techniques herein may be implemented in a streaming media device, streaming media enabled TV, set-top box, DVR or other audiovisual device, or a special-purpose computer that is configured as shown in FIG. 2, and in other embodiments the techniques may be implemented using stored programs that are loaded and executed using a general-purpose computer. For embodiments that use software components, the drawing figures and description herein may provide algorithms, programming instructions and other information that can be used to implement the components.

In an embodiment, application 200 represents a media application configured to retrieve and display media streams obtained from the CDN 105. For example, the application 200 may, upon startup, display a user interface from which a user may select a media title for streaming. In response, the application 200 sends a request for the stream to the server computer 104 and receives back a location identifier into the CDN 105 for the media title. The application then requests and receives the stream from the location within the CDN 105, which is displayed to the user via a player contained within or in the vicinity of the user interface. In some embodiments, the application 200 represents a mobile application programmed for a particular mobile platform or mobile operating system, such as iOS, Android, and so forth. However, in other embodiments, the application 200 may be programmed to run on other platforms or operating systems, such as Linux, Windows, OS X, and so forth.

In an embodiment, activity component 201 represents one or more processes, threads, or other instantiations of code executing on the client computer 100. For the purpose of illustrating clear examples, it will be assumed the activity component 201 is a single process executing on the client computer 100. In an embodiment, the activity component 201 represents a process configured to provide a screen, window, and/or user interface with which users can interact to perform operations related to the application 200. For example, the activity component 201 may be configured to display a user interface showing media titles for selection and/or a player which presents selected media titles. Thus, the activity component 201 represents a process responsible for constructing the front end of the application 200 that a user actually views and through which the user can provides input.

In an embodiment, the activity component 201 is configured to progress through various lifecycle states during the general operation of the client computer 100. For example, the activity component 201 may be configured to perform certain actions when it is the current focus (for example, the interface at the forefront of the display of the client computer 100) and other actions upon detecting that the focus has changed to a different application. Thus, as an example, the activity component 201 may be configured to obtain particular resources, such as the screen buffer 202, when the application 200 is the current focus in order to draw the user interface and may release the screen buffer 202 upon detecting that the focus has changed to a different application executing on the client computer 100. In some embodiments, the operating system of the client computer 100 is configured to invoke a specialized function of the application 200 associated with the particular lifecycle state into which the application 200 has moved. For example, the application 200 may define a function for startup, a function for becoming the focus, a function for losing the focus, a function for shut down, and so forth.

In an embodiment, screen buffer 202 represents the raw buffer that is used to store pixel data to display on the screen of the client computer 100. Thus, the screen buffer 202 represents the canvas upon which applications of the client computer 100 draw in order provide user interfaces and other forms of display for users to view. For example, the screen buffer 202 may be implemented as a matrix of pixel positions and values. However, in another embodiment, the screen buffer 202 may represent an abstraction layer or interface between the raw buffer and the application 200 that is configured to provide functions for presenting graphics for display on a screen of the client computer 100. In still another embodiment, in cases where the client computer 100 represents a second screen device, the screen buffer 202 may represent a handle onto a raw buffer of the paired device, such as a television, laptop computer, desktop computer, and so forth. In an embodiment, the screen buffer 202 represents a shared resource for applications of the client computer 100 and therefore only one application or application group can hold the screen buffer 202 at the same time. Thus, when the application 200 loses the focus of the client computer 100, the activity component 201 releases the screen buffer 202 so that the application which is new focus can draw on the screen and interact with the user. The term "shared resources" will be used to refer to resources which can only be held by one application or application group at a time.

In an embodiment, service component 203 represents one or more processes, threads, or other instantiations of code executing on the client computer 100. For the purpose of illustrating clear examples, it will be assumed the service component 203 is a single process. In an embodiment, the service component 203 represents a process that executes in the background, but does not provide a user interface and therefore is "hidden" from users of the client computer 100. In an embodiment, the service component 203 provides background tasks for the application 200, such as communicating with the server computer 104 and/or CDN 105, receiving and decoding the media stream, digital rights management functions, media player management, and so forth. In an embodiment, the activity component 201 accesses the functionality and data provided by the service component via an inter-process communication mechanism, such as an Application Programming Interface (API). For example, the activity component 201 may retrieve data from the service component 203 representing a media stream to draw onto the screen buffer 202 to cause the client computer 100 to present a player displaying the media stream. Furthermore, the activity component 201 may provide controls, such as widgets, in the user interface which cause the activity component 201 to provide instructions to the service component 203. For example, upon hitting a "pause" button, the activity component 201 may invoke the player component 208 of the service component 203 to pause the media stream.

In some embodiments, the service component 203 is configured to progress through lifecycle states similarly to the activity component 201 described above. However, the lifecycle states of the service component 203 may differ from the activity component 201 in some embodiments. For example, in the Android operating system, the service processes must "bind" to an activity process before inter-process communication can be established. As a result, the service component 203 may contain functions or code which triggers on lifecycle states relating to binding or unbinding to the activity component 201. Consequently, in such embodiments, the function related to the activity component 201 startup or becoming the focus may include instructions for binding to the service component 203, while functions related to the activity component shutting down or losing the focus may include unbinding from the service component 203.

In an embodiment, streaming engine component 204 represents a component of application 200 responsible managing the content stream. In an embodiment, the steaming engine component 204 maintains streaming media buffer 205, media cryptographic context 206, and media control context 207. The streaming media buffer 205 represents a buffer that stores streaming media obtained from the CDN 105. For example, streaming media buffer 205 may store the portions of the media stream that have presently been received by the client computer 100 from the CDN 105. In some embodiments, the streaming media buffer 205, when read by another component, continues to store the read data so that functions such as rewind or skipping to a previous point in time can be performed without the need to re-buffer the media stream.

In an embodiment, the media cryptographic context 206 stores the cryptographic keys and/or other metadata used to securely communicate with the server computer 104 and/or the CDN 105.

In an embodiment, the media control context 207 represents a sub-component of the streaming engine component 204 that manages communications between the client computer 100 and the CDN 105. For example, the media control context 207 may include data and instructions for a control protocol used to request/receive titles from the server computer 104 and request/receive a stream of a particular title from a location within the CDN 105.

According to an embodiment, the media cryptographic context 206 establishes a secure connection to the server computer 104. Once the secure connection to the server computer 104 is established, the media control context 207 sends control messages to the server computer 104 which request a particular media title. When the media control context 207 receives back a location within the CDN 105 to retrieve a stream of the media title, the media cryptographic context 206 establishes a secure connection with the location within the CDN 105. Once the secure connection with the CDN 105 is established, the media control context 207 requests the media stream and receives back data representing the stream from the CDN 105. Upon receiving the stream, the activity component 201 stores the data in the streaming media buffer 205 for retrieval by the player component 208. However, depending on the implementation, some embodiments may be configured to allow the same cryptographic keys to be used for both the server computer 104 and the CDN 105.

However, in some embodiments, the media cryptographic context 206, instead of or in addition to the functions described above, stores the DRM keys, licenses, and/or session information required to decrypt the media content. For example, the DRM keys, licenses, and/or session information may be obtained by the digital rights management agent 212 (or another component) and stored within the media cryptographic context 206. As another example, the media cryptographic context 206 may be configured to obtain the DRM keys, licenses, and/or session information on its own accord for use by other components. In an embodiment, the media cryptographic context 206 is utilized by the digital rights management agent 212 to retrieve the keys, licenses, and/or session information required to decrypt a particular media stream. Furthermore, in embodiments where the media cryptographic context 206 stores DRM keys instead of the cryptographic keys used for communication with the server computer 104 and/or content distribution network 105, another component (such as the media control context 207) can be configured to establish the secure connections to the server computer 104 and/or content distribution network 105 using the same techniques described above. Thus, any description involving the media cryptographic context 206 establishing secure connections may, in other embodiments, be performed by other components, such as the media control context 207.

In an embodiment, player component 208 represents a component of application 200 responsible for managing playback of the media stream. For example, the player component 208 may implement functions for performing playback operations, such as play, pause, resume, fast forward, rewind, skip, jump to position, and so forth.

In an embodiment, the player component 208 acts as an intermediary between the streaming engine component 204 and the media pipeline component 210. Thus, in an embodiment, the player component 208 retrieves data from the streaming media buffer 205 of the streaming engine component 204 and feeds that data into the media pipeline component 210 for decoding, synchronization, digital rights management functions, and so forth. For example, when the play function is triggered, the player component 208 retrieves data from the streaming media buffer 205 to feed into the media pipeline component 210. However, when the pause function is triggered, the player component 208 ceases to feed data from the streaming media buffer 205 to the digital media pipeline component 210. However, the player component 208 keeps track of where playback left off for when play is resumed. Similarly, fast forward, rewind, and skip functions can be implemented by the player component 208 changing the speed at which the data is fed into the media pipeline component 210, replaying past frames stored in the streaming media buffer 205, skipping frames in the streaming media buffer 205, and so forth. The player context 209 represents data and/or metadata related to the playback, such as how far the current playback has progressed into the media, current state of playback, how much time is left until playback completes, and so forth.

In an embodiment, media pipeline component 210 represents a component of the application 200 that decodes the media stream, performs digital rights management functions, and provides content for display by the activity component 201. However, in some embodiments, the media pipeline component 210 passes decoded media streams to the screen buffer 202 without using the activity component 201 as an intermediary. In an embodiment, the media pipeline component 210 includes a decoder 211 and a digital rights management agent 212. The decoder 211 represents a component that is responsible for decoding the format of the digital media stream. For example, the media stream stored in the streaming media buffer 205 may include audio and/or video streams which are encoded in a particular format, such as MPEG-4, H.264, HEVC, Theora, Dirac, and so forth. The media pipeline component 210 feeds the encoded media stream from the streaming media buffer 205 into the decoder 211 to obtain a decoded media stream which is then returned to the activity component 201 for display. However, in some embodiments, the decoder 211 instead passes the decoded media stream to the screen buffer 202 without using the activity component 201 as an intermediary. In some embodiments, the decoder 211 represents a shared resource that is shared between applications executing on the client computer 100. For example, the decoder 211 may be implemented at least partially in hardware and be configured to serve only one application or application group at a time.

In an embodiment, the digital rights management agent 212 represents a component that performs digital rights management functions, such as determining which DRM plug-ins are installed on the client computer 100, receiving information about specific plug-ins (such as the MIME types and file suffices they support), registering the client computer 100 with an online DRM service, retrieving license constraints for rights-protected content, checking whether a particular user has the proper rights to play or use rights-protected content, associating rights-protected content with a corresponding license so that the activity component 201 can play the content, and so forth. In some embodiments, the digital rights management agent 212 securely stores the content keys acquired with the license and uses those keys to decrypt the media content prior to being processed by the decoder 211. In some embodiments, the digital rights management agent 212 represents a shared resource. In some embodiments, the content keys required to decrypt the media content is stored in the media cryptographic context 207 and retrieved by the digital rights management agent 212 to perform the decryption. Thus, for example, when the streaming media pipeline component 210 is established by the service component 203 to handle media content, the digital rights management agent 212 is invoked to handle DRM related functions to verify the client computer 100 or a user of the client computer 100 is authorized to view the selected media title.

4.0 Suspended Playback Process Flow

Figure 3:
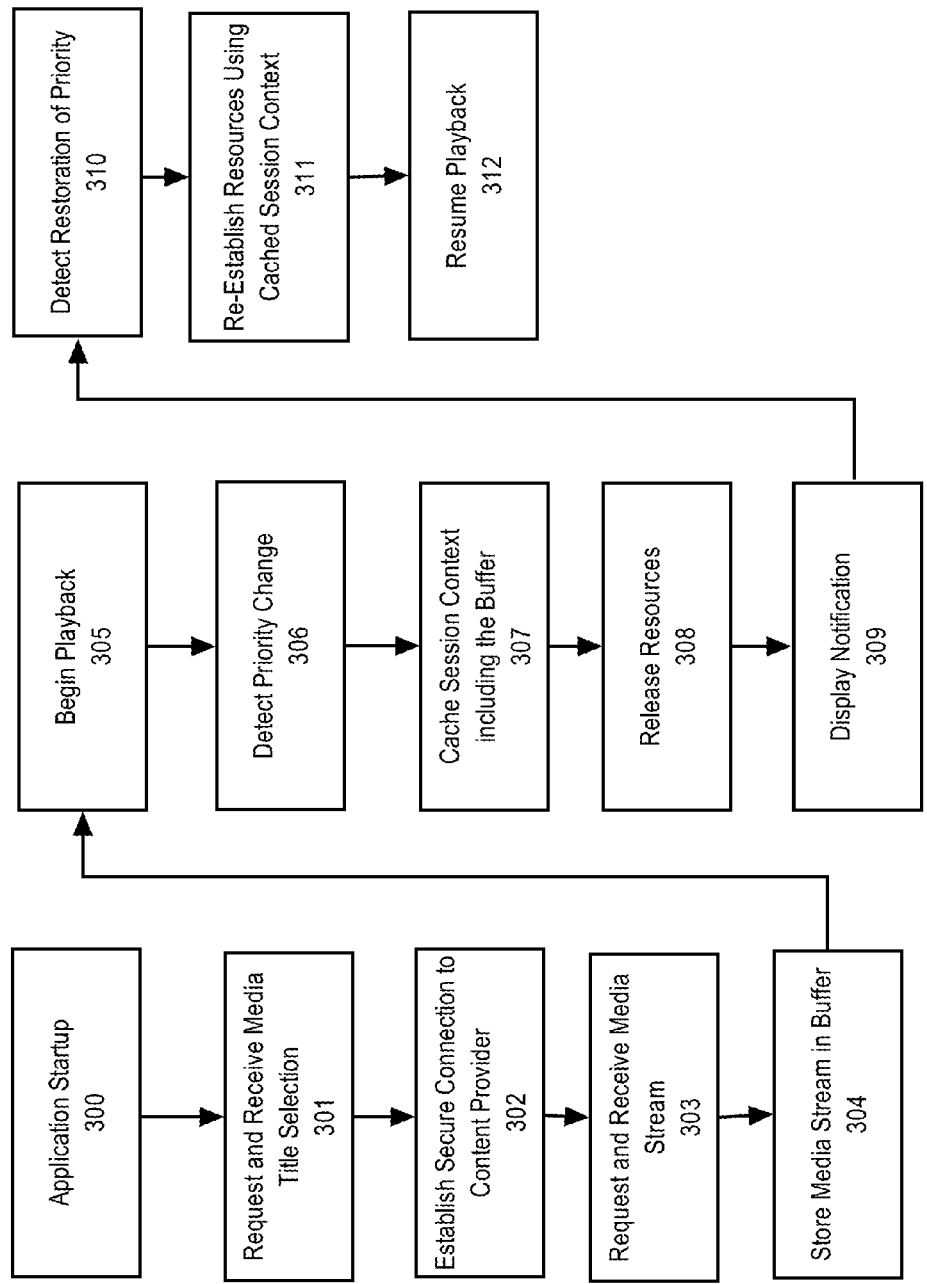
FIG. 3 illustrates a process flow for suspended playback in block diagram form according to an embodiment.

FIG. 3 illustrates a process flow for suspended playback in block diagram form according to an embodiment. Although the blocks of FIG. 3 are displayed in a particular order, in other embodiments the order of the blocks may follow a different order. In addition, other embodiments may divide out blocks into multiple sub-blocks, combine multiple blocks into a single block, add blocks, or skip blocks compared to the process flow depicted in FIG. 3. In order to provide clear examples, it will be assumed that the steps depicted in FIG. 3 are performed by application 200 and components thereof. However, in other embodiments, the steps may be split between the application 200 and the operating system implemented on the client computer 100. For some embodiments that use software components, FIG. 3 may serve as an algorithm or plan for developing program instructions to implement the components and/or functions performed by the components.

At block 300, the application 200 performs startup tasks. For example, the application 200 may perform startup tasks upon being executed by the client computer 100 in response to user input or invocation by another application or the operating system. In an embodiment, upon startup, the application executes the activity component 201, which reserves the screen buffer 202 and draws any user interfaces and/or windows required to interact with the user and/or present media content. In addition, the application 200 executes service component 203, which establishes the streaming engine component 204, player component 208, media pipeline component 210, and their corresponding sub-components as depicted in FIG. 2.

At block 301, the application 200 receives selection of a particular media title for streaming. In an embodiment, the application 200 receives the selection of the particular media title via a user interface displayed by the activity component 201. For example, the activity component 201 may display a user interface that allows users to browse titles by actor, genre, director, name, keyword, and so forth. Thus, the activity component 201 may display the names of titles or graphics associated with the titles that can be selected via the user interface. In other embodiments, the activity component 201 may recommend videos based on a profile of the user, demographics of the user, previous selections made by the user, and so forth.

At block 302, the application 200 establishes a secure connection to the content provider. In an embodiment, the streaming engine component 204 establishes a secure connection to the server computer 104 via the protocol(s) implemented by the media cryptographic context 206. For example, an encryption/decryption key may be negotiated for communications between the client computer 100 and the server computer 104. The streaming engine component 204 then sends a request via control protocols implemented by the media control context 207 specifying the media title selected at block 301. The server computer 104 identifies a location with the CDN 105 where the media title can be obtained and sends an identifier for that location to the streaming engine component 204 via the control protocol. In response to receiving the location identifier, the streaming engine component 204 establishes a secure connection to the server computer 104 via the protocol(s) implemented by the media cryptographic context 206. In some embodiments, the streaming engine component 204 may use the same cryptographic keys established with the server computer 104 for communications with the CDN 105. However, in other embodiments, the streaming engine component 204 will negotiate a different key or set of keys for the communication. In some embodiments, the secure connection to the server computer 104 and/or the CDN 105 can be established during startup at block 300 or when the user provides credentials to the application 200 (such as during "log in"). The established secure connections can then be used for communications in lieu of performing block 302.

At block 303, the application 200 requests and receives the media stream for the selected media title from the CDN 105. In an embodiment, the streaming engine component 204 requests the media stream by sending an identifier for the media title selected at block 301 to the location identified by the server computer 104 at block 302. The location within the CDN 105 then returns a data stream to the streaming engine component 204 upon which the audio and/or video content for the media title has been encoded. In some embodiments, the request sent to the CDN 105 at block 303 adheres to the control protocol implemented by the media control context 207. However, in other embodiments, the streaming engine component 204 may utilize a different protocol to request and/or receive the media stream. In response to the request from the streaming engine component 204, the CDN 105 sends the media stream back to the streaming engine component 204.

At block 304, the application 200 stores the media stream in a streaming media buffer 205. In an embodiment, the streaming engine component 204 fills in the streaming media buffer 205 as the data becomes available. For example, CDN 105 may send the media stream in segments of data which are labeled or tagged with their relative positions in the stream. Thus, as the segments are received by the streaming engine component 204, the streaming engine component 204 places those segments at appropriate positions within the streaming media buffer 205.

At block 305, the application 200 begins playback of the media title. In an embodiment, once the streaming media buffer 205 has been filled to a threshold amount of contiguous data, the player component 208 obtains the encoded media data from the streaming media buffer 205 and feeds that data into the media pipeline component 210. For example, the player component 208 may use a static amount of data for the threshold or the threshold may be based on available network bandwidth to ensure data is obtained quickly enough to avoid re-buffering during playback. The media pipeline component 210 decodes the data from the streaming media buffer 205 using the decoder 211 and performs DRM functions related to the media title using the digital rights management agent 212. In some embodiments, the digital rights management agent 212 uses a content key acquired with the license for the media title to decrypt the media stream prior to the media stream being passed to the decoder 212. For example, depending on the embodiment, the content key may be acquired from its own memory store, the media cryptographic context 206, or from a source external to the client computer 100 (such as the server 104 or CDN 105). In some embodiments, the media pipeline component 210 also performs synchronization functions, such as synchronizing the audio and video streams to ensure a smooth playback of the media stream. After the functions of the media pipeline component 210 are complete, the media pipeline component 210 passes the decoded media stream to the activity component 201 for display via a user interface, window, screen, and so forth. However, in other embodiments, the media pipeline component 210 instead passes the decoded media stream to the screen buffer 202 without using the activity component 201 as an intermediary.

At block 306, the application 200 detects a priority change. In an embodiment, the priority change is detected due to the application 200 undergoing a lifecycle state change, such as shifting away from the focus of the client computer 100. For example, the client computer 100 may have executed another application which takes priority, the user may have "minimized" the user interface provided by the activity component 201, or any other event that places the application 200 in a lower priority state. In some embodiments, the priority change occurs as a result of an interruption in the network connection providing the data stream. The exact event which causes the priority change is not critical to the techniques described herein. In response to the priority change at block 306, the player component 208 pauses playback of the media title. In some embodiments, block 306 is triggered when the application 200 pauses the media being played. For example, block 306 may be triggered in response to the player component 208 transitioning to a "pause playback" state. Thus, the application 200 can release some resources, such as shared resources, when the application 200 is paused while keeping around other resources to expedite resumption of the playback.

At block 307, the application 200 caches the current session context. In an embodiment, the application 200 caches the current session context by storing the data and metadata associated with one or more components and/or sub-components of the service component 203. For example, the application 200 may cache the keys stored in the media cryptographic context 206, the data in the streaming media buffer 205, the current state and/or progression of playback from the player context 209, certificates/credentials obtained via the digital rights management agent 212, location within the CDN 105 where the media title is located, and so forth. In some embodiments, the session context includes resources and data stored by the components of the application 200 which are exclusive to the application 200. Thus, in some embodiments, shared resources such as the screen buffer 202 and the decoder 211 are released for use by other applications. In an embodiment, the application 200 caches the current session context by not releasing a lock on those resources and the memory storing the session data. However, in environments where memory is a limited resource and needs to be released to support higher priority applications, the application 200 stores the session context in a lower priority cache, on disk, or in an auxiliary storage device to be retrieved once priority to the application 200 is restored. In some embodiments, assuming the application 200 is developed according to objection oriented programming principles, the "objects" representing the components themselves are cached, thus retaining the state information of each component. However, in other embodiments, data from the "objects" are stored instead, with the objects being recreated and re-initialized with the saved data at a later time. While the current session context is cached, the playback is considered to be "suspended".

At block 308, the application 200 releases one or more resources. In an embodiment, the application 200 releases shared resources at block 308, such as the screen buffer 202 and decoder 211, which are shared between applications on the client computer 100. However, in other embodiments, the application 200 releases data and/or processes which require more than a threshold amount of memory, network sockets, processing time, network bandwidth, or any other measure of computer resources. In still other embodiments, the application 200 releases resources, data, processes, and so forth based on a combination of factors, such whether those resources are shared between applications, the amount of resources consumed, the likelihood the application to which priority has switched will require those resources, and so forth. In some embodiments, the release is controlled by the operating system of the client computer 100, rather than the application 200, based on the needs of the higher priority application or in the interest of general system efficiency.

At block 309, the application 200 causes display of a notification that includes information related to the suspended playback. In an embodiment, in response to the change in lifecycle state, the application 200 invokes a function of the operating system of the client computer 100 that inserts a notification into a special notification area of an overlay provided by the operating system. For example, the special notification area may be a menu bar or tool bar displayed on an edge of the screen. As another example, such as in the context of a mobile device, the special notification area may be accessed by "swiping" the screen near an edge to reveal a list of pending notifications. In an embodiment, the notification provides information related to the suspended playback such as the current title being watched, a selectable option for resuming playback, current date information, how much of the title has already been viewed, how much of the title is left to view, and so forth. A more detailed explanation of the notification is described below in Section 5.0 titled "EXAMPLE NOTIFICATION WINDOW".

At block 310, the application 200 detects that priority within the client computer 100 has been restored. In an embodiment, the application 200 detects priority has been restored as a result of the operating system invoking a function related to the lifecycle change of becoming the focus of the client computer 100. For example, the function may be invoked as a result of the operating system receiving user selection of the application 200, invocation of the application 200 by a different application, user input received via the notification displayed at block 309, and so forth. In some embodiments, such as in the case where the interruption is due to a loss of network connection, the application 200 detects priority has been restored as a result of the network connection being re-established.

At block 311, the application 200 re-establishes the resources released at block 308 using the cached session context. In an embodiment, upon regaining priority, the application 200 re-establishes the resources released at block 308 and merges those resources with the cached session context. For example, in the diagram of FIG. 2, if the decoder 211 and screen buffer 202 have been released due to being shared resources, the application 200 obtains those resources again through the operating system. The obtained resources are then plugged into the framework provided by the rest of the components/sub-components which have been cached. In some embodiments, if network connections have been severed as a result of the application context switch or an interruption in the network, the streaming engine component 204 reestablishes those connections. For example, if the cryptographic keys have been cached from the media cryptographic context 206, those keys can be used to establish a secured connection without the need for re-negotiation. The streaming engine component 204 can then request, via the protocols implemented by the media control context 207, that the CDN 105 begin streaming the media title from a point immediately after when content from the streaming media buffer 205 would run out.

At block 312, the application 200 resumes playback of the media title. In an embodiment, the application 200 is able to immediately resume playback of the media title once the resources related to displaying the content, such as the screen buffer 202 and decoder 211, have been reacquired. For example, since the streaming media buffer 205 has been cached, the player component 208 can immediately pull data from the streaming media buffer 205 for the media pipeline component 210 to process and provide to the activity component 201 for display via the screen buffer 202. As a result, playback can resume without the need to wait for the connection to the CDN 105 to be re-established and for the streaming media buffer 205 to be re-filled. The cached streaming media buffer 205 provides a cushion of time during which the application 200 can acquire remaining resources and establish the network connections needed to fill the streaming media buffer 205 with new content. As a result, the step of block 312 may in fact be performed within or concurrently with block 311. For example, the application 200 may be configured to prioritize acquiring the resources needed to begin playback from the streaming media buffer 205 over resources needed to acquire new data for the streaming media buffer 205. Thus, playback may begin after the first set of resources have been acquired, but before the second set of resources have been required to minimize delay in presenting the content. In the event that the player component 208 runs out of content from the streaming media buffer 205 or detects that the remaining content has fallen below a threshold, the player component 208 temporarily pauses the playback until the streaming media buffer 205 has been sufficiently filled. In some embodiments, rather than resuming playback immediately where the player component 208 left off at block 306, the player component 208 instead skips the playback back a specified amount, such as a couple seconds. As a result, the user is provided a chance to re-familiarize themselves with the presented scene before content that they have not yet seen is presented.

In some embodiments, the amount of data cached at block 307 is dependent on the resolution of the media stream being played by the application 200. For example, if the application 200 is configured to cache a specific time interval of media in the streaming media buffer 205, such as two minutes, the amount of data required to play two minutes of the media stream will be larger for greater resolutions. Thus, in some embodiments, the application 200 may store only a particular amount of data from the streaming media buffer 205 to ensure that playback will not be interrupted by further buffering when reacquiring released resources and beginning playback at blocks 311-312.

5.0 Example Notification Window

Figure 4:
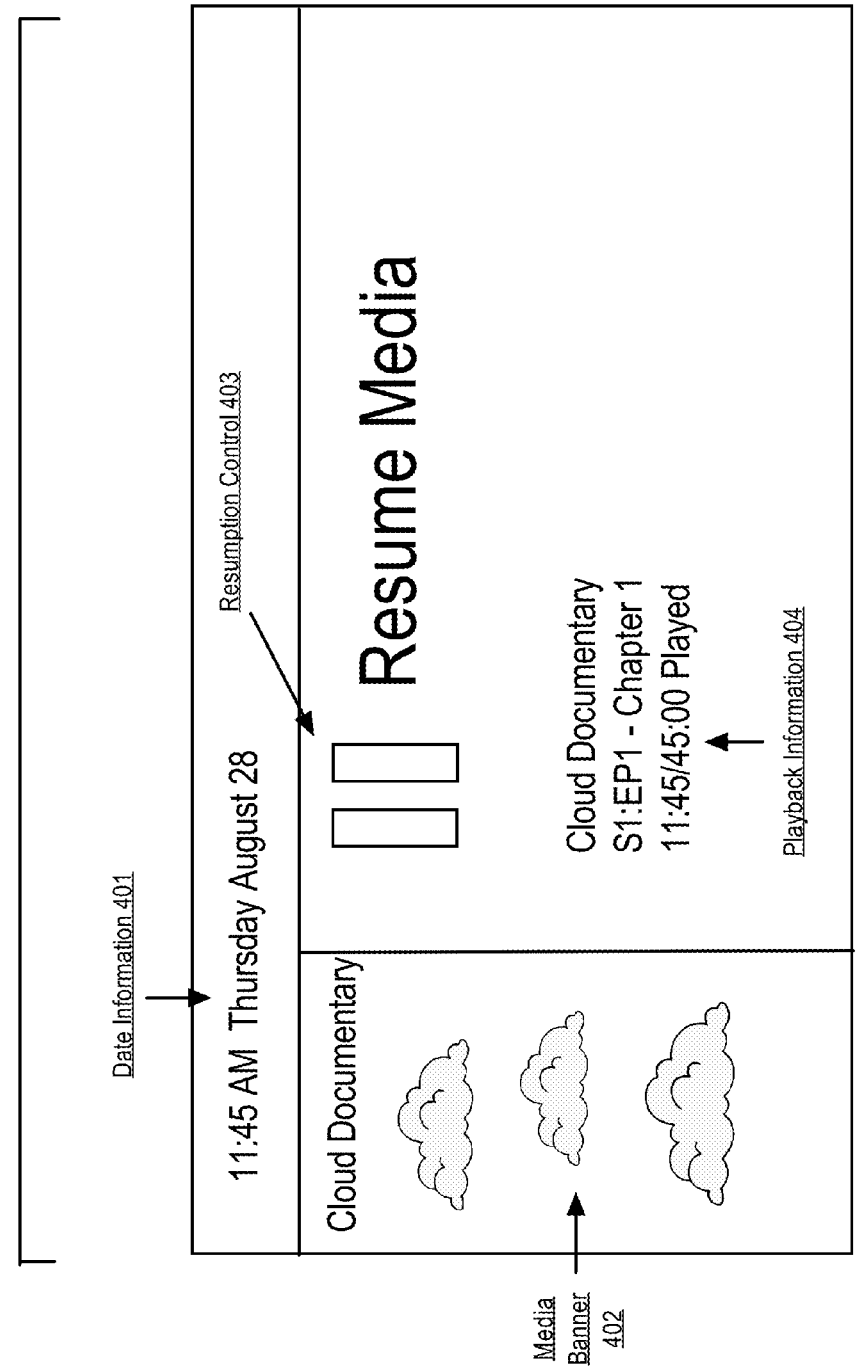
FIG. 4 illustrates a notification window for reactivating a media application according to an embodiment.

FIG. 4 illustrates a notification window for reactivating a media application according to an embodiment. In order to illustrate a clear example, it will be assumed that notification 400 is displayed as a result of block 309 of FIG. 3.

In an embodiment, notification 400 represents a notification that provides a user of the client computer 100 with information regarding the suspended playback. In some embodiments, the notification 400 is displayed on an edge or corner of the screen of the client computer 100. For example, the notification 400 may be displayed in a menu bar or tool bar displayed along an edge of the screen. In some embodiments, the notification 400 has a "minimized" graphic and a "maximized" graphic. For example, the notification 400 may be displayed using a small "minimized" graphic while in a general menu or toolbar. However, when the "minimized" graphic is selected, the notification 400 is displayed in full form. However, in other embodiments, the notification 400 is always displayed using the same "maximized" graphic. In some embodiments, the notification 400 or a "minimized" graphic thereof is displayed in a menu that requires particular input to be displayed. For example, the operating systems of mobile devices often reserve a special notification area that can be accessed by "swiping" the edge of the screen. In FIG. 4, the notification 400 includes date information 401, media banner 402, resumption control 403, and playback information 404.

In an embodiment, date information 401 represents the current time and date. For example, the operating system of the client computer 100 may provide a system call that returns the current time and date from a clock component of the client computer 100. The time and date received via the system call is the displayed as the date information 401.

In an embodiment, media banner 402 represents a graphic associated with the media title for which playback is suspended. For example, the media banner 402 may be a scene from the media title, such as the scene at which the playback was suspended. However, as another example, the media banner 402 may be a specialized graphic that is sent by the server computer 104 or CDN 105 to accompany the stream. In an embodiment, the media banner 402 represents a movie "poster" that identifies the media title. The exact graphic displayed for the media banner 402 is not critical.

In an embodiment, resumption control 403 represents a selectable control that restarts the suspended playback. In an embodiment, selection of resumption control 403 causes priority to pass back to the application 200 and thus signifies the transition from block 309 to block 310 in FIG. 3. In some embodiments the resumption control 403 is displayed as a widget with a particular graphic, such as the "pause" sign, to indicate that it controls content that is currently being suspended.

In an embodiment, playback information 404 represents information related to the current playback. For example, the playback information 404 may include the name of the title currently being played, the season/episode/chapter number of the title, the amount of playback into the title, and so forth.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
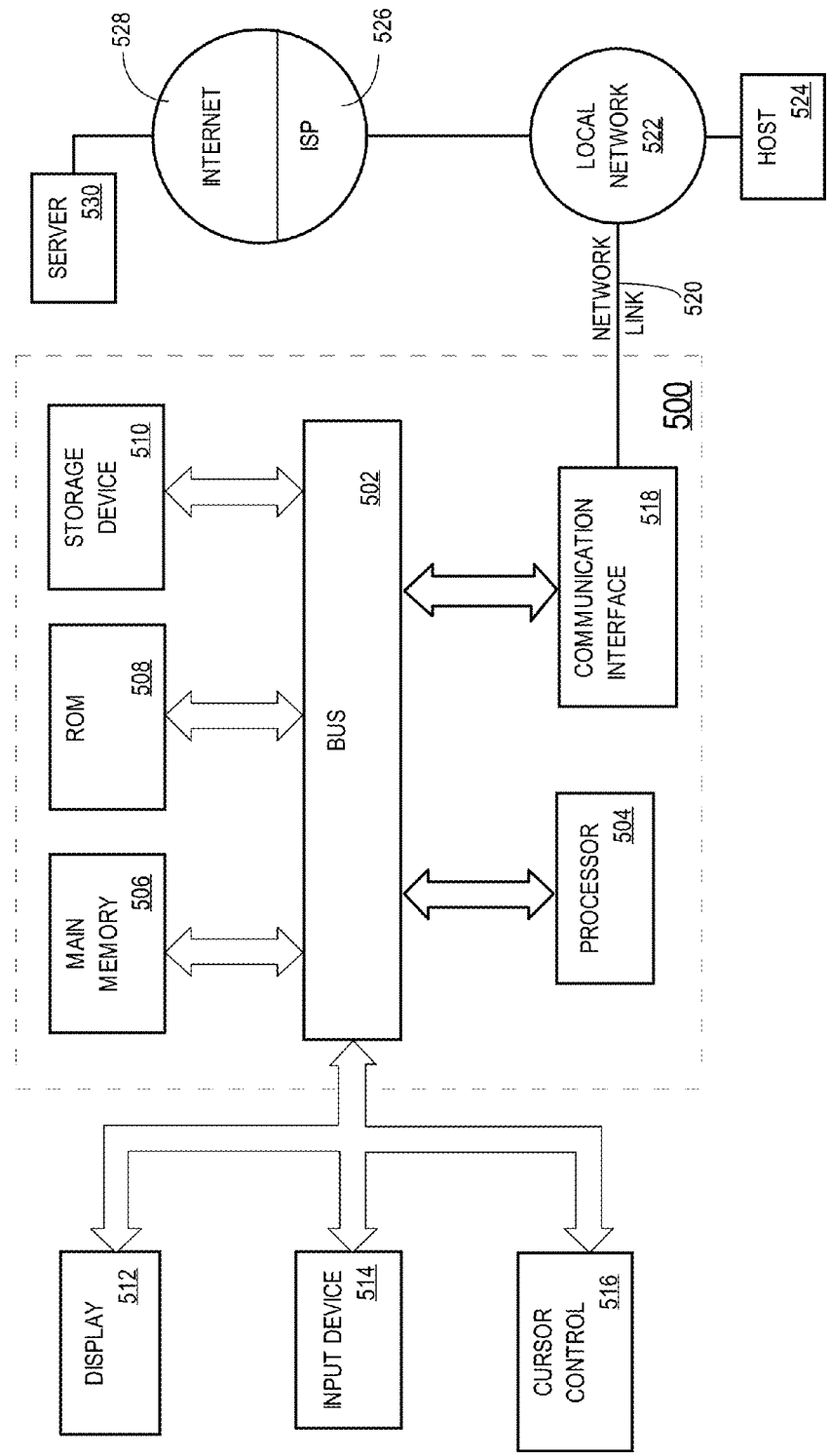
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

8.0 Additional Disclosure

Aspects of the subject matter described herein are set out in the following numbered clauses:

1. A method comprising: acquiring, by a first application executing on a first computer, one or more resources of the first computer, wherein the one or more resources include one or more shared resources that are shared among applications of the first computer; receiving, by the first application, a media stream from a second computer; presenting playback, by the first application, of the media stream; in response to detecting that priority within the first computer has shifted to a second application executing on the first computer, the first application pausing the playback of the media stream and releasing the one or more shared resources while retaining one or more remaining resources of the one or more resources that relate to a session context; in response to detecting that priority has shifted back to the first application, the first application re-acquiring the one or more shared resources and resuming the playback of the media stream based at least in part on the one or more remaining resources that relate to the session context; wherein the method is performed by one or more computing devices.

2. The method of Clause 1, wherein the one or more resources include a streaming media buffer and further comprising: in response to receiving the media stream from the second computer, storing first data from the media stream in the streaming media buffer, wherein the streaming media buffer is a member of the one or more remaining resources that relate to the session context and the playback is resumed by at least retrieving second data from the streaming media buffer for presentation during the playback.

3. The method of Clause 2, wherein the playback of the media stream is resumed before additional data of the media stream is received from the second computer and added to the streaming media buffer.

4. The method of any of Clauses 1-3, further comprising: establishing a secure connection to the second computer, wherein the secure connection is based on one or more cryptographic keys, wherein the media stream is received over the secure connection and the one or more cryptographic keys are a member of the one or more remaining resources that relate to the session context; in response to detecting that priority has shifted back to the first application, the first application re-establishing the secure connection to the second computer using the one or more cryptographic keys.

5. The method of any of Clauses 1-4, wherein the one or more shared resources includes a decoder for decoding the media stream.

6. The method of Clause 5, wherein the decoder is implemented at least partially in hardware.

7. The method of any of Clauses 1-6, wherein the one or more shared resources includes a screen buffer that controls a screen of the first computer.

8. The method of any of Clauses 1-7, wherein the playback is resumed at a point in time that is earlier than when first application paused the playback of the media stream.

9. The method of any of Clauses 1-8, further comprising: in response to detecting that priority within the first computer has shifted to the second application, the first application causing the first computer to display a notification that contains information related to the playback of the media stream.

10. The method of Clause 9, wherein the notification includes one or more of: time information, a graphic associated with the media stream, a title of the media stream, an episode identifier of the media stream, a season identifier of the media stream, a chapter identifier of the media stream, a total playback time of the media stream, a playback remaining time of the media stream, or a resumption control that, when selected, causes the first computer to shift priority back to the first application.

11. A non-transitory computer-readable storage medium storing one or more instructions which, when executed by one or more processors, cause the one or more processors to perform steps comprising: acquiring, by a first application executing on a first computer, one or more resources of the first computer, wherein the one or more resources include one or more shared resources that are shared among applications of the first computer; receiving, by the first application, a media stream from a second computer; presenting playback, by the first application, of the media stream; in response to detecting that priority within the first computer has shifted to a second application executing on the first computer, the first application pausing the playback of the media stream and releasing the one or more shared resources while retaining one or more remaining resources of the one or more resources that relate to a session context; in response to detecting that priority has shifted back to the first application, the first application re-acquiring the one or more shared resources and resuming the playback of the media stream based at least in part on the one or more remaining resources that relate to the session context.

12. The non-transitory computer-readable medium of Clause 11, wherein the one or more resources include a streaming media buffer and the steps further comprise: in response to receiving the media stream from the second computer, storing first data from the media stream in the streaming media buffer, wherein the streaming media buffer is a member of the one or more remaining resources that relate to the session context and the playback is resumed by at least retrieving second data from the streaming media buffer for presentation during the playback.

13. The non-transitory computer-readable medium of Clause 12, wherein the playback of the media stream is resumed before additional data of the media stream is received from the second computer and added to the streaming media buffer.

14. The non-transitory computer-readable medium of any of Clauses 11-13, wherein the steps further comprise: establishing a secure connection to the second computer, wherein the secure connection is based on one or more cryptographic keys, wherein the media stream is received over the secure connection and the one or more cryptographic keys are a member of the one or more remaining resources that relate to the session context; in response to detecting that priority has shifted back to the first application, the first application re-establishing the secure connection to the second computer using the one or more cryptographic keys.

15. The non-transitory computer-readable medium of any of Clauses 11-14, wherein the one or more shared resources include a decoder for decoding the media stream.

16. The non-transitory computer-readable medium of Clause 15, wherein the decoder is implemented at least partially in hardware.

17. The non-transitory computer-readable medium of any of Clauses 11-16, wherein the one or more shared resources include a screen buffer that controls a screen of the first computer.

18. The non-transitory computer-readable medium of any of Clauses 11-17, wherein the playback is resumed at a point in time that is earlier than when first application paused the playback of the media stream.

19. The non-transitory computer-readable medium of any of Clauses 11-18, wherein the steps further comprise: in response to detecting that priority within the first computer has shifted to the second application, the first application causing the first computer to display a notification that contains information related to the playback of the media stream.

20. The non-transitory computer-readable medium of Clause 19, wherein the notification includes one or more of: time information, a graphic associated with the media stream, a title of the media stream, an episode identifier of the media stream, a season identifier of the media stream, a chapter identifier of the media stream, a total playback time of the media stream, a playback remaining time of the media stream, or a resumption control that, when selected, causes the first computer to shift priority back to the first application.

What is claimed is:

1. A method comprising:
acquiring, by a first application executing on a first computer, resources of the first computer, wherein the resources include one or more shared resources that are shared among applications of the first computer;
receiving, by the first application, a media stream from a second computer;
presenting playback, by the first application, of the media stream;
upon detecting that a priority within the first computer has shifted to a second application executing on the first computer, the first application:
pausing the playback of the media stream,
releasing the one or more shared resources, and
storing one or more remaining resources of the resources in a different location than a current location of the one or more remaining resources, wherein the one or more remaining resources relate to a session context,
wherein the stored one or more remaining resources includes a streaming media buffer that contains a plurality of encoded frames of the media stream;
in response to detecting that the priority has shifted back to the first application, the first application:
re-acquiring the one or more shared resources,
retrieving the one or more remaining resources that were previously stored, and
resuming the playback of the media stream based at least in part on the one or more remaining resources;
wherein the method is performed by one or more computing devices.

2. The method of claim 1, further comprising:
in response to receiving the media stream from the second computer, storing first data from the media stream in the streaming media buffer, wherein the playback is resumed by at least retrieving the first data from the streaming media buffer for presentation during the playback.

3. The method of claim 2, wherein the playback of the media stream is resumed before additional data of the media stream is received from the second computer and added to the streaming media buffer.

4. The method of claim 1, further comprising:
establishing a secure connection to the second computer, wherein the secure connection is based on one or more cryptographic keys, wherein the media stream is received over the secure connection and the one or more cryptographic keys are a member of the stored one or more remaining resources;
in response to detecting that the priority has shifted back to the first application, the first application re-establishing the secure connection to the second computer using the one or more cryptographic keys.

5. The method of claim 1, wherein the one or more shared resources include a decoder for decoding the media stream.

6. The method of claim 1, wherein the one or more shared resources includes a screen buffer that controls a screen of the first computer.

7. The method of claim 1, wherein the playback is resumed at a point in time that is earlier than when the first application paused the playback of the media stream.

8. The method of claim 1, further comprising:
in response to detecting that the priority within the first computer has shifted to the second application, the first application causing the first computer to display a notification that contains information related to the playback of the media stream.

9. The method of claim 8, wherein the notification includes one or more of:
time information,
a graphic associated with the media stream,
a title of the media stream,
an episode identifier of the media stream,
a season identifier of the media stream,
a chapter identifier of the media stream,
a total playback time of the media stream,
a playback remaining time of the media stream, or
a resumption control that, when selected, causes the first computer to shift the priority back to the first application.

10. The method of claim 1, wherein the streaming media buffer enables the first application to skip playback.

11. The method of claim 1, wherein the stored one or more remaining resources includes at least one of:
a cryptographic key,
a progression of playback,
a credential obtained through a digital rights management agent, or
a location of the media stream in the second computer.

12. The method of claim 1, wherein the stored one or more remaining resources are stored in a first location associated with a lower priority that a second location used by the second application when the second application has the priority.

13. A non-transitory computer-readable storage medium storing one or more instructions which, when executed by one or more processors, cause the one or more processors to perform steps comprising:
acquiring, by a first application executing on a first computer, resources of the first computer, wherein the resources include one or more shared resources that are shared among applications of the first computer;
receiving, by the first application, a media stream from a second computer;
presenting playback, by the first application, of the media stream;
upon detecting that a priority within the first computer has shifted to a second application executing on the first computer, the first application:
pausing the playback of the media stream,
releasing the one or more shared resources, and
storing one or more remaining resources of the resources in a different location than a current location of the one or more remaining resources, wherein the one or more remaining resources relate to a session context,
wherein the stored one or more remaining resources includes a streaming media buffer that contains a plurality of encoded frames of the media stream;
in response to detecting that the priority has shifted back to the first application, the first application:
re-acquiring the one or more shared resources,
retrieving the one or more remaining resources that were previously stored, and resuming the playback of the media stream based at least in part on the one or more remaining resources.

14. The non-transitory computer-readable medium of claim 13, wherein the steps further comprise:
in response to receiving the media stream from the second computer, storing first data from the media stream in the streaming media buffer, wherein the playback is resumed by at least retrieving the second data from the streaming media buffer for presentation during the playback.

15. The non-transitory computer-readable medium of claim 14, wherein the playback of the media stream is resumed before additional data of the media stream is received from the second computer and added to the streaming media buffer.

16. The non-transitory computer-readable medium of claim 13, wherein the steps further comprise:
establishing a secure connection to the second computer, wherein the secure connection is based on one or more cryptographic keys, wherein the media stream is received over the secure connection and the one or more cryptographic keys are a member of the stored one or more remaining resources;
in response to detecting that the priority has shifted back to the first application, the first application re-establishing the secure connection to the second computer using the one or more cryptographic keys.

17. The non-transitory computer-readable medium of claim 13, wherein the one or more shared resources include a decoder for decoding the media stream.

18. The non-transitory computer-readable medium of claim 13, wherein the one or more shared resources includes a screen buffer that controls a screen of the first computer.

19. The non-transitory computer-readable medium of claim 13, wherein the playback is resumed at a point in time that is earlier than when the first application paused the playback of the media stream.

20. The non-transitory computer-readable medium of claim 13, wherein the steps further comprise:
in response to detecting that the priority within the first computer has shifted to the second application, the first application causing the first computer to display a notification that contains information related to the playback of the media stream.

21. The non-transitory computer-readable medium of claim 20, wherein the notification includes one or more of:
time information,
a graphic associated with the media stream,
a title of the media stream,
an episode identifier of the media stream,
a season identifier of the media stream,
a chapter identifier of the media stream,
a total playback time of the media stream,
a playback remaining time of the media stream, or
a resumption control that, when selected, causes the first computer to shift the priority back to the first application.

* * * * *